(12) United States Patent
Fujita (10) Patent No.: US 7,718,286 B2
(45) Date of Patent: May 18, 2010

(54) ABNORMALITY DETECTING DEVICE OF FUEL CELL SYSTEM

(75) Inventor: Nobuo Fujita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 921 days.

(21) Appl. No.: 10/576,788

(22) PCT Filed: Oct. 14, 2004

(86) PCT No.: PCT/IB2004/003365

§ 371 (c)(1),
(2), (4) Date: Apr. 21, 2006

(87) PCT Pub. No.: WO2005/041333

PCT Pub. Date: May 6, 2005

(65) Prior Publication Data

US 2007/0082240 A1   Apr. 12, 2007

(30) Foreign Application Priority Data

Oct. 24, 2003   (JP)   ............... 2003-364524

(51) Int. Cl.
*H01M 8/04* (2006.01)
(52) U.S. Cl. .......................................... 429/22; 429/17
(58) Field of Classification Search ............... 429/22, 429/24, 25
See application file for complete search history.

(56) References Cited

U.S. PATENT DOCUMENTS

| | | | |
|---|---|---|---|
| 3,748,180 A | 7/1973 | Clausi et al. | |
| 5,441,821 A | 8/1995 | Merritt et al. | |
| 5,763,113 A | 6/1998 | Meltser et al. | |
| 6,864,003 B2 | 3/2005 | Ueda et al. | |
| 7,264,900 B2 * | 9/2007 | Ueda et al. | 429/34 |
| 2002/0022161 A1 | 2/2002 | Kurosaki et al. | |
| 2002/0094469 A1 | 7/2002 | Yoshizumi et al. | |
| 2003/0022031 A1 | 1/2003 | Manery | |
| 2003/0077487 A1 | 4/2003 | Roberts et al. | |
| 2003/0077488 A1 | 4/2003 | Yamamoto et al. | |
| 2004/0013919 A1 | 1/2004 | Ueda et al. | |

(Continued)

FOREIGN PATENT DOCUMENTS

DE   196 20 501 C1   6/1997

(Continued)

*Primary Examiner*—Patrick Ryan
*Assistant Examiner*—Thomas H. Parsons
(74) *Attorney, Agent, or Firm*—Kenyon & Kenyon LLP (57) ABSTRACT

An abnormality detecting device of a fuel cell system according to the invention includes a hydrogen off-gas circulation passage for making hydrogen off-gas discharged from a fuel cell flow back to an anode; a discharge passage for discharging part of the hydrogen off-gas, which is circulated through the hydrogen off-gas circulation passage, from the hydrogen off-gas circulation passage; a hydrogen discharge valve provided in the discharge passage; abnormality determining means for determining whether an abnormality has occurred in opening/closing of the hydrogen discharge valve and gas state quantity detecting means for detecting a gas state quantity of the hydrogen off-gas, the gas state quantity detecting means being provided in the discharge passage at a position downstream from the hydrogen discharge valve. The abnormality determining means determines whether an abnormality has occurred in opening/closing of the hydrogen discharge valve based on the gas state quantity of the hydrogen off-gas.

14 Claims, 5 Drawing Sheets

U.S. PATENT DOCUMENTS

2008/0070090 A1 3/2008 Yoshizumi et al.

FOREIGN PATENT DOCUMENTS

| DE | 697 01 432 T2 | 8/2000 |
|---|---|---|
| DE | 102 01 668 A1 | 11/2002 |
| EP | 1 223 631 A2 | 7/2002 |
| JP | 9-209810 | 8/1997 |
| JP | 11-288731 A | 10/1999 |
| JP | 2002-042839 A | 2/2002 |
| JP | 2003-017094 | 1/2003 |
| JP | 2003-092125 | 3/2003 |
| JP | 2003-132915 A | 5/2003 |
| JP | 2003-151592 | 5/2003 |
| WO | WO 02/27848 A2 | 4/2002 |

* cited by examiner

ABNORMALITY DETECTING DEVICE OF FUEL CELL SYSTEM

INCORPORATION BY REFERENCE

This is a 371 national phase application of PCT/IB2004/003365 filed Oct. 14, 2004, the content of which is incorporated herein by reference. The disclosure of Japanese Patent Application No. 2003-364524 filed on Oct. 24, 2003, including the specification, drawings and abstract is incorporated herein by reference in its entirety.

BACKGROUND OF THE INVENTION

1. Field of the Invention

The invention relates to an abnormality detecting device for detecting an abnormality in a hydrogen discharge valve provided in a fuel cell system.

2. Description of the Related Art

In a fuel cell system in which electric power is generated by supplying fuel gas and oxidizing gas to a fuel cell stack constituted by stacking plural cells in series, there is a known structure in which unreacted hydrogen gas is reused for a cell reaction by making hydrogen off-gas (anode off-gas) discharged from an anode gas channel flow back to an anode. A hydrogen discharge valve for discharging part of the hydrogen off-gas is provided in a hydrogen off-gas circulation passage. By regularly opening the hydrogen discharge valve when a concentration of ingredients other than hydrogen contained in hydrogen off-gas becomes high, a concentration of hydrogen to be supplied to the anode is maintained appropriately. However, if an abnormality occurs in the hydrogen discharge valve and opening/closing operation of the valve cannot be performed properly, a problem occurs in a cell operation. Accordingly, Japanese Patent Laid-Open Publication No. 2003-92125 discloses a technology for detecting a hydrogen discharge command to a hydrogen discharge valve, and determining whether a failure has occurred in the hydrogen discharge valve based on a target pressure of a fuel supply portion of a fuel cell stack and an actually detected value.

According to the technology disclosed in this publication, however, the determination as to whether a failure has occurred in the hydrogen discharge valve is made only when the fuel cell is being operated normally. Accordingly, when the fuel cell is in a transition state, for example, when an accelerator pedal is depressed abruptly, an appropriate failure determination cannot be made.

Document U.S. Pat. No. 5,441,821 discloses an electric power generation system having a regulated vacuum ejector for recirculating the fluid fuel stream. The system includes a fuel cell stack, a pressurised fuel supply having a pressure control valve for regulating the pressure of the fuel supply, a vacuum ejector interposed between the fuel supply and the stack fuel stream inlet, a pressure transducer interposed between the ejector discharge outlet and the stack fuel stream inlet, and a pressurised oxidant supply with a pressure transducer. The ejector suction inlet is fluidly connected to the fuel stream outlet of the fuel cell stack. The fuel stream pressure transducer transmits a signal to the pressure control value to adjust the pressure of the fuel supply when detected pressure of the fuel stream deviates from a predetermined value. The oxidant stream pressure transducer transmits a signal to the pressure control value to adjust the pressure of the fuel supply when the detected pressure of the oxidant stream changes.

Further, document JP 09-209810 discloses a failure detector for intake air control valve mechanism of an engine to easily detect a failure condition of an intake air control valve mechanism without accompanying complexation of construction and control, and to externally display the failure condition rapidly and certainly, by composing a driving means control part and a failure judging part in an ECU, and externally displaying the failure condition of the intake air control valve mechanism on an display. In this detector, an engine operating condition detecting means is arranged which judges whether or not an engine operating condition is in regular condition. Further, a pressure sensor detects pressure in an intake air pass when the intake control valve is opened/closed. When pressure difference in opening/closing periods between the detected pressure is at a predetermined value or more, failure judging means in the ECU judges that the engine operating condition is normal, and when pressure difference is smaller than the predetermined value, it judges that the engine operating condition is normal, and when pressure difference is smaller than the predetermine value, it judges that the engine operating conditions is in failure condition. Displaying means externally displays whether or not the engine operating condition is in failure condition on the basis of these judgement.

A fuel cell system form an underwater vehicle is further disclosed in documents U.S. Pat. No. 3,748,180. This fuel cell system has at least one fuel cell module for supplying electrical power for said vehicle. A first tank containing hydrogen is connected to one reactant chamber of a fuel cell module and second tank containing oxygen is connected to another reactant chamber of the fuel cell module. The hydrogen product water output from the hydrogen reactant chamber is condensed and separated and the water produced is stored in the first tank containing hydrogen. The fuel cell module is placed in a containment vessel which is pressurised with nitrogen. A catalytic reactor is provided in the containment vessel to form water in the event that there are simultaneous leaks in both the hydrogen and oxygen high pressure supply lines. A pressure transducer is also provided in the containment vessel for shutting down the system if there is a high pressure leak in either the hydrogen or oxygen line.

Further, document EP 1 223 631 A2 discloses a method and apparatus for detecting leakage current in the coolant of a fuel cell stack between said stack and the ground stack chassis, using a voltmeter to measure the voltage across the coolant. If the coolant voltage is at or below a predetermined level, an excessive level of conductivity in the coolant exists, and the presence of leakage current is reported.

Further, document US 2003/077487 A1 discloses methods for improving the cold starting capability of an electrochemical fuel cell wherein temperature dependant methods can be used to improve the cold start capability of fuel cell electric power generation systems. A method of ceasing operation of an electric power generation system improves the cold start capability and freeze tolerance of a fuel cell stack by reducing the amount of water remaining within the passages of the stack. The method involves purging one or more of the fuel cell stack oxidant and fuel passages at shutdown prior to allowing the fuel cell stack to drop to temperatures below the freezing point of water. Preferably purging at shutdown is conducted at a temperature below the stack operating temperature. Another method, used at start-up, involves directing a coolant fluid stream to the fuel cell stack only after a predetermined temperature above the freezing temperature of water is exceeded. Preferably, after freezing the fuel cell stack is heated to a temperature above its normal operating temperature before the operation is commenced.

It is therefore an object of the invention to solve the abovementioned problem, and provide an abnormality detecting device for detecting an abnormality in a hydrogen discharge valve regardless of an operation state of a fuel cell.

SUMMARY OF THE INVENTION

An abnormality detecting device of a fuel cell system according to the invention includes a hydrogen off-gas circulation passage for making hydrogen off-gas discharged from a fuel cell flow back to an anode of the fuel cell; a discharge passage for discharging part of the hydrogen off-gas, which is circulated through the hydrogen off-gas circulation passage, from the hydrogen off-gas circulation passage; a hydrogen discharge valve provided in the discharge passage; abnormality determining means for determining whether an abnormality has occurred in opening/closing of the hydrogen discharge valve; and gas state quantity detecting means for detecting a gas state quantity of the hydrogen off-gas, the gas state quantity detecting means being provided in the discharge passage at a position downstream from the hydrogen discharge valve. The abnormality determining means determines whether an abnormality has occurred in opening/closing of the hydrogen discharge valve based on the gas state quantity of the hydrogen off-gas. Whether an abnormality has occurred in opening/closing of the hydrogen discharge valve is determined based on the gas state quantity of the hydrogen off-gas, which is detected by the gas state quantity detecting means provided downstream from the hydrogen discharge valve. Accordingly, it is possible to determine whether an abnormality has occurred regardless of an operation state of the fuel cell.

In the abnormality detecting device of a fuel cell system according to the invention, in addition to the above-mentioned structure, a mixing chamber for mixing the hydrogen off-gas discharged from the discharge passage with external gas may be further provided, and the gas state quantity detecting means may be configured to detect the gas state quantity of the hydrogen off-gas which is mixed with the external gas in the mixing chamber. By detecting a change in the gas state quantity between before and after the hydrogen gas is mixed with the external gas, accuracy of detecting the gas state quantity can be enhanced.

In the abnormality detecting device of a fuel cell system according to the invention, the external gas may be part of oxidizing gas to be supplied to a cathode of the fuel cell. Thus, a system structure can be simplified.

In the abnormality detecting device of a fuel cell system according to the invention, the hydrogen discharge valve may be an electromagnetic valve, and the abnormality determining means may determine whether an abnormality has occurred in opening/closing of the hydrogen discharge valve based on the gas state quantity detected by the gas state quantity detecting means so as to deal with a change in an input of an opening/closing control signal to the electromagnetic valve. By detecting the gas state quantity detected by the gas state quantity detecting means so as to deal with the change in the input of the opening/closing control signal to the hydrogen discharge valve, an abnormality in opening/closing of the hydrogen discharge valve can be detected.

In the abnormality detecting device of a fuel cell system according to the invention, the abnormality determining means may determine whether an abnormality has occurred in opening/closing of the electromagnetic valve based on a change with time in the gas state quantity detected by the gas state quantity detecting means so as to deal with the change in the input of the opening/closing control signal to the electromagnetic valve. By detecting the change with time in the gas state quantity detected by the gas state quantity detecting means so as to deal with the change in the input of the opening/closing control signal to the hydrogen discharge valve, an abnormality in opening/closing of the hydrogen discharge valve can be detected.

In the abnormality detecting device of a fuel cell system according to the invention, the gas state quantity may be a physical quantity related to one of a hydrogen concentration, a flow speed, a pressure, a proportion of each ingredient, a temperature and a dielectric constant of the hydrogen off-gas.

In the abnormality detecting device of a fuel cell system according to the invention, gas state quantity detecting means for detecting the gas state quantity of the hydrogen off-gas may be further provided in the discharge passage at a position upstream from the hydrogen discharge valve, and the abnormality determining means may be configured to detect an abnormality in opening/closing of the hydrogen discharge valve based on the gas state quantity detected by the gas state quantity detecting means provided on each of an upstream side and a downstream side of the hydrogen discharge valve. By determining whether an abnormality has occurred in opening/closing of the hydrogen discharge valve based on the gas state quantity detected by the gas state quantity detecting means provided upstream from the hydrogen discharge valve and the gas state quantity detected by the gas state quantity detecting means provided downstream from the hydrogen discharge valve, accuracy of the determination as to whether an abnormality has occurred can be enhanced.

In the abnormality detecting device of a fuel cell system according to the invention, gas-liquid separating means for separating the hydrogen off-gas into gas and liquid may be further provided, and the gas state quantity detecting means may detect the gas state quantity of the hydrogen off-gas which has been separated into gas and liquid by the gas-liquid separating means. By separating the hydrogen off-gas into gas and liquid, the gas state quantity detecting means can be inhibited from making erroneous detection.

In the abnormality detecting device of a fuel cell system according to the invention, a pressure sensor which detects a pressure of the hydrogen off-gas may be provided in the discharge passage at a position downstream from the hydrogen discharge valve. By detecting the pressure of the hydrogen off-gas, whether an abnormality has occurred in opening/closing of the hydrogen discharge valve can be determined.

In the abnormality detecting device of a fuel cell system according to the invention, a temperature sensor which detects a temperature of the hydrogen off-gas may be provided in the discharge passage at a position downstream from the hydrogen discharge valve. By detecting a temperature of the hydrogen off-gas, whether an abnormality has occurred in opening/closing of the hydrogen discharge valve can be determined.

In the abnormality detecting device of a fuel cell system according to the invention, paired electrodes, which are opposed to each other, may be provided in the mixing chamber. By detecting a dielectric constant of the hydrogen off-gas, whether an abnormality has occurred in opening/closing of the hydrogen discharge valve can be determined.

In the abnormality detecting device of a fuel cell system according to the invention, a heat wire resistance connected to a voltage source may be provided in the mixing chamber. By detecting a heat conductivity of the hydrogen off-gas by making the heat wire resistance generate heat using Joule heat and measuring a resistance value, whether an abnormality has occurred in opening/closing of the hydrogen discharge valve can be determined.

In the abnormality detecting device of a fuel cell system according to the invention, there may be provided means for dealing with a failure when the abnormality determining means detects an abnormality in opening/closing of the hydrogen discharge valve. Thus, safety of the fuel cell system can be enhanced.

According to the invention, whether an abnormality has occurred in the hydrogen discharge valve is determined based on the gas state quantity of the hydrogen off-gas, which is detected by the gas state quantity detecting means provided downstream from the hydrogen discharge valve. Accordingly, whether an abnormality has occurred in opening/closing of the hydrogen discharge valve can be determined regardless of the operation state of the fuel cell.

DETAILED DESCRIPTION OF THE PREFERRED EMBODIMENTS

Hereafter, preferred embodiments of the invention will be described in detail with reference to accompanying drawings.

Figure 1:
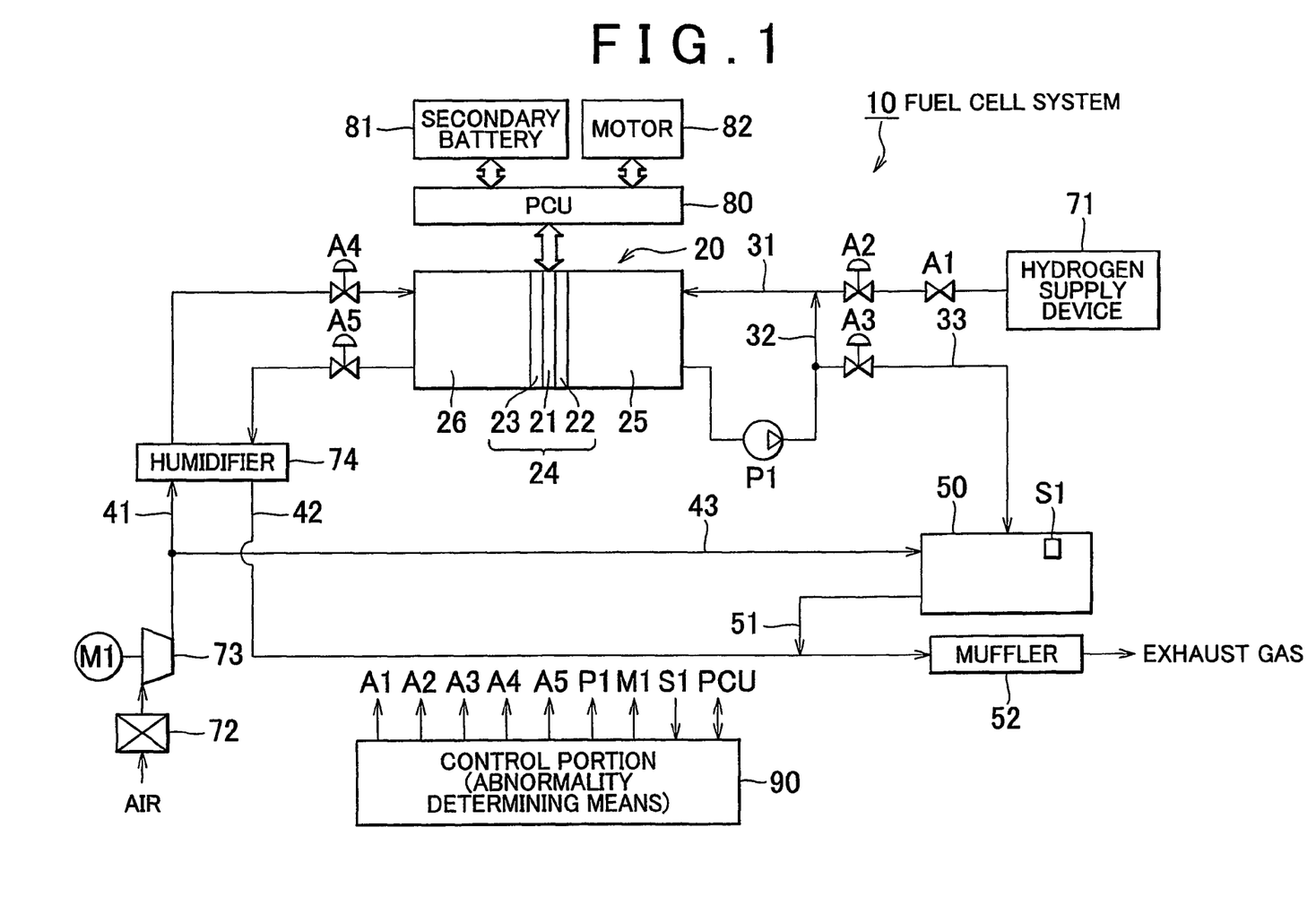
FIG. 1 is a diagram schematically showing a structure of a fuel cell system according to a first embodiment.

Initially, a first embodiment of the invention will be described. FIG. 1 is a diagram schematically showing a structure of a fuel cell system 10 according to the first embodiment. The fuel cell system 10 is an electric power generation system to be mounted in a fuel cell powered electric vehicle. The fuel cell system 10 includes a fuel cell (cell stack) 20 which generates electric power by being supplied with reaction gas (fuel gas, oxidizing gas). The fuel cell 20 includes a membrane-electrode assembly (MEA) 24 which is constituted by forming an anode 22 on one side of a polymer electrolyte membrane 21 and a cathode 23 on the other side of the polymer electrolyte membrane 21 by screen printing or the like. The polymer electrolyte membrane 21 is constituted of a proton-conductive ion-exchange membrane formed of fluorocarbon resin or the like. The membrane-electrode assembly (MEA) 24 is sandwiched by ribbed separators (not shown). A groove-like anode gas channel 25 is formed between one of the separators and the anode 22, and a groove-like cathode gas channel 26 is formed between the other separator and the cathode 23. Here, a structure of a cell constituted of the membrane-electrode assembly 24, the anode gas channel 25 and the cathode gas channel 26 is schematically shown for convenience of description. However, in actuality, there is provided a stack structure in which plural cells are stacked in series and the ribbed separator is interposed between adjacent cells.

In a fuel gas supply system of the fuel cell system 10, there are formed a fuel gas passage 31 for supplying fuel gas to the anode gas channel 25, and a hydrogen off-gas circulation passage 32 for making hydrogen off-gas discharged from the anode gas channel 25 flow back to the fuel gas passage 31. In the fuel gas passage 31, there are provided a shutoff valve A1 which controls supply/supply stop of the fuel gas from a hydrogen supply device 71, and a regulator A2 which adjusts a pressure of the fuel gas. In the hydrogen off-gas passage 32, there is provided a hydrogen pump P1 for pressurizing the hydrogen off-gas whose pressure has dropped by passing through the anode gas channel 25 so as to make the hydrogen off-gas flow back to the fuel gas passage 31. Also, a discharge passage 33, which is used for discharging part of the hydrogen off-gas to the outside of the system when a concentration of ingredients other than hydrogen included in the hydrogen off-gas becomes high, is communicated to the hydrogen off-gas circulation passage 32. A hydrogen discharge valve A3 is provided in the discharge passage 33 so as to adjust the amount of the hydrogen off-gas to be discharged. As the hydrogen discharge valve A3, an electromagnetic valve is preferably used. However, a linear valve or an ON/OFF valve may be used. A lower end of the discharge passage 33 is communicated to a mixing chamber 50, and the hydrogen off-gas flowing through the discharge passage 33 is introduced to the mixing chamber 50. The hydrogen off-gas introduced to the mixing chamber 50 is introduced to an oxygen off-gas passage 42 through a discharge passage 51, and is discharged to the outside of the system after a noise thereof is reduced by a muffler 52.

Meanwhile, in an oxidizing gas supply system of the fuel cell system 10, there are formed an oxidizing gas passage 41 for supplying oxidizing gas to the cathode gas channel 26, and the oxygen off-gas passage 42 for discharging the oxygen off-gas (cathode off-gas) discharged from the cathode gas channel 26. In the oxidizing gas passage 41, there are provided an air filter 72 for filtering dust contained in the air introduced from the outside of a vehicle; an air compressor 73 driven by a motor M1; a humidifier 74 for appropriately humidifying the air pressurized by the air compressor 73; and a control valve A4 which adjusts the amount of the oxidizing gas to be supplied to the cathode gas channel 26. In the oxygen off-gas passage 42, there are provided a control valve A5 for adjusting a pressure, and the humidifier 74. In the humidifier 74, water is exchanged between the oxygen off-gas which has been highly moisturized by water generated due to a cell reaction of the fuel cell 20 and the oxidizing gas having a low humidity, that is taken in from the outside of the vehicle. The oxygen off-gas flowing through the oxygen off-gas passage 42 is discharged to the outside of the system after noise thereof is reduced by the muffler 52.

As gas state quantity detecting means for detecting a gas state quantity of the hydrogen off-gas, a hydrogen sensor S1 is provided in the mixing chamber 50. The hydrogen sensor S1 is preferably arranged at a position downstream from the hydrogen discharge valve A3. The gas state quantity of the hydrogen off-gas flowing on the upstream side of the hydrogen discharge valve A3, such as a hydrogen concentration, flow speed, pressure, proportion of each ingredient, temperature, changes continuously according to the operation state of the fuel cell 20. Particularly, when the system is brought to the transition state due to load fluctuation caused by abrupt depression of an accelerator pedal, or the like, the gas state quantity of the hydrogen off-gas largely changes. Accordingly, when the gas state quantity detecting means such as the hydrogen sensor S1 is provided upstream from the hydrogen discharge valve A3 and the gas state quantity is detected, it is difficult to accurately detect an abnormality in opening/closing of the hydrogen discharge valve A3 in the transition state. However, when the gas state quantity detecting means is provided downstream from the hydrogen discharge valve A3, it is possible to determine whether an abnormality has occurred in opening/closing of the hydrogen discharge valve A3 regardless of the operation state of the system.

The mixing chamber 50 is a gas chamber for accurately detecting the gas state quantity of the hydrogen gas by mixing the hydrogen gas flowing on the downstream side of the hydrogen discharge valve A3 with the external gas. In the embodiment, whether an abnormality has occurred in opening/closing of the hydrogen discharge valve A3 is determined by providing the hydrogen sensor S1 in the mixing chamber 50 and detecting a change in the hydrogen concentration in the mixing chamber 50. With the structure in which only the hydrogen off-gas is introduced to the mixing chamber 50, it is impossible to detect a change in the hydrogen concentration due to gas leakage or the like from the hydrogen discharge valve A3. However, by introducing the external gas to the mixing chamber 50 and mixing the external gas with the hydrogen off-gas, it is possible to accurately detect a change in the hydrogen concentration using the difference in the hydrogen concentration between when the hydrogen off-gas is mixed with the external gas and when the hydrogen off-gas is not mixed with the external gas. The type of the external gas which is to be mixed with the hydrogen off-gas is not particularly limited as long as the gas does not cause a problem in the detection of a change in the hydrogen concentration. For example, using pressurized air flowing through the oxidizing gas supply system of the fuel cell 20 simplifies the system structure. In the embodiment, a gas supply passage 43, which branches off from the oxidizing gas passage 41 and which is communicated to the mixing chamber 50, is formed, and a predetermined flow amount of pressurized air output from the air compressor 73 is introduced to the mixing chamber 50. FIG. 1 shows the structure in which the gas supply passage 43 branches off from the oxidizing gas passage 41 and is communicated to the mixing chamber 50. Meanwhile, the gas supply passage 43 may branch off from the oxygen off-gas passage 42 and may be communicated to the mixing chamber 50. As the external gas to be introduced to the mixing chamber 50, dry air having humidity as low as possible is preferably used in order not to cause a problem in the detection of the hydrogen concentration. Particularly, it is preferable to use the pressurized air flowing through the oxidizing gas passage 41, which has not been humidified by the humidifier 74.

A PCU (Power Control Unit) 80 is an electric power control device including an inverter and a DC/DC converter. The electric power generated by the fuel cell 20 is converted into alternating current power (three phase current) by the PCU 80 and supplied to a motor (three phase synchronous motor) 82 for vehicle running. The surplus of the electric power generated by the fuel cell 20 is down-converted into electric power having a low voltage by the PCU 80, and supplied to a secondary battery 81. The secondary battery 81 serves as a regenerative energy reservoir at the time of regeneration of a brake, and an energy buffer at the time of load fluctuation due to acceleration or deceleration of the vehicle. As the secondary battery 81, a nickel-cadmium storage battery, a nickel-hydrogen storage battery, a lithium secondary battery or the like is preferably used.

A control portion 90 inputs a sensor signal output from the hydrogen sensor S1 and detects the hydrogen concentration of the hydrogen off-gas, as well as controlling the shutoff valve A1, the regulator A2, the hydrogen discharge valve A3, the control valve A4, the control valve A5, the hydrogen pump P1, the motor M1, and the PCU 80 according to the operation state of the fuel cell system 10. When the hydrogen off-gas is discharged, the control portion 90 performs opening/closing control of the hydrogen discharge valve A3 by outputting an opening/closing control signal (opening/closing command) to the hydrogen discharge valve A3, and also serves as abnormality determining means for determining whether an abnormality has occurred in opening/closing of the hydrogen discharge valve A3 based on the sensor signal output from the hydrogen sensor S1.

Figure 2A:
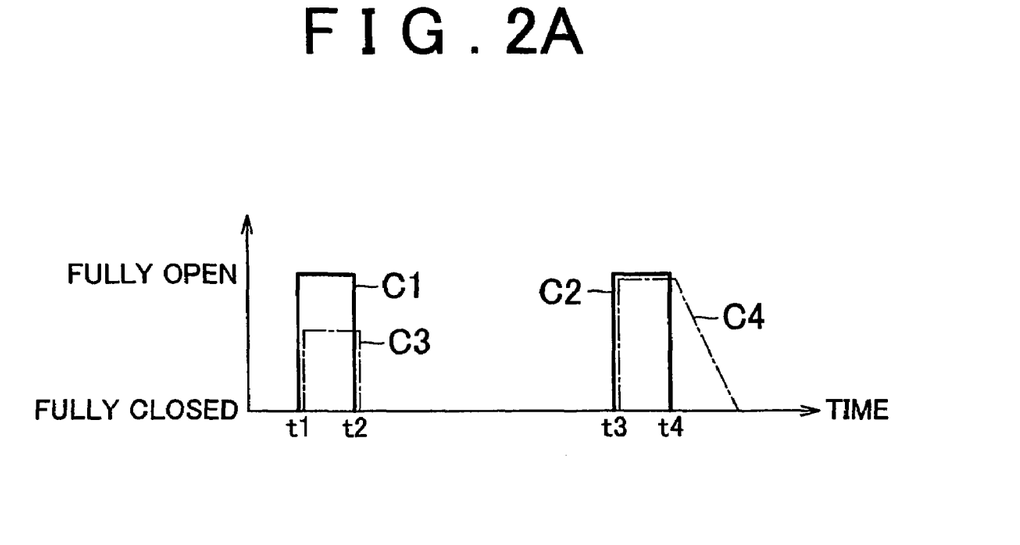
FIG. 2 indicates graphs one of which shows an opening/closing control signal provided to a hydrogen discharge valve and the other of which shows a change in a hydrogen concentration, and these graphs corresponding to each other.
Figure 2B:
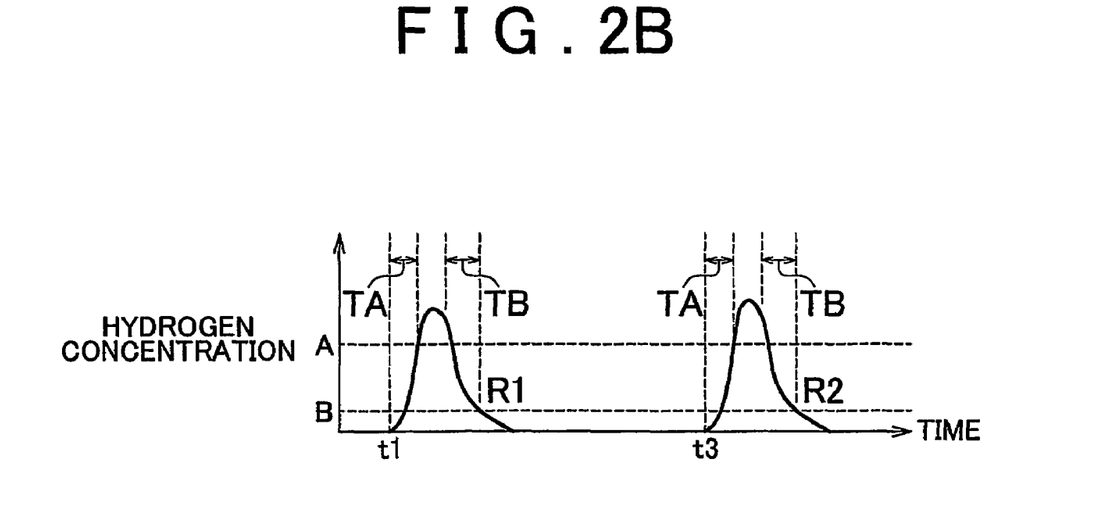

FIG. 2 shows a change in the hydrogen concentration detected by the hydrogen sensor S1 when the opening/closing control signal is input in the hydrogen discharge valve A3. Here, whether an abnormality has occurred in opening/closing of the hydrogen discharge valve A3 is determined by inputting the opening/closing control signal in the hydrogen discharge valve A3 and checking the change in the hydrogen concentration in the mixing chamber 50 between before and after the opening/closing control signal is input. It is preferable to detect the change in the hydrogen concentration by inputting signals having various waveform patterns as the opening/closing control signal. For example, as shown in FIG. 2(*a*), opening/closing control signals C1 and C2 for opening the valve in the period from time t1 to t2 and the period from time t3 to t4, respectively, are input. Then, as shown in FIG. 2(*b*), the response waveforms of the hydrogen sensor S1 are detected as response wave forms R1 and R2 which start rising at time t1 and time t3, respectively. In this case, when the response waveforms R1 and R2 become equal to or higher than a threshold concentration A within a predetermined time TA of time t1 and time t3, respectively, it is determined that the hydrogen discharge valve A3 is in an "open state (normal operation)". When the response waveforms R1 and R2 are equal to or higher than a threshold concentration B and lower than the threshold concentration A, it is determined that the hydrogen discharge valve A3 is in a "half open state (half open failure)". When the response waveforms R1 and R2 are equal to or lower than the threshold concentration B, it is determined that the hydrogen discharge valve A3 is in a "closed state (close failure)". Also, when the response waveforms R1 and R2 become equal to or lower than the threshold concentration B within a predetermined time TB of time t2 and t4, respectively, it is determined that the hydrogen discharge valve A3 is in a "closed state (normal operation)". When the response wave forms R1 and R2 are equal to or higher than the threshold concentration B and lower than the threshold concentration A, it is determined that the hydrogen discharge valve A3 is in the "half open state (half open failure)". When the response wave forms R1 and R2 are equal to or higher than the threshold concentration A, it is determined that the hydrogen discharge valve A3 is in an "open state (open failure)". When, for example, an ON/OFF valve is employed as the hydrogen discharge valve A3, it can be determined which state from among the "fully open state", "half open state" and "fully closed state" the hydrogen discharge valve A3 is in.

The threshold concentration A is a concentration for determining whether an "open failure" has occurred. The threshold concentration B is a concentration for determining whether a "close failure" has occurred. The concentration A is higher than the concentration B. The "open failure" signifies a failure state where the hydrogen discharge valve A3 is kept open and cannot be closed. The "close failure" signifies a failure state where the hydrogen discharge valve A3 is kept closed and cannot be opened.

The opening/closing control signals C1 and C2 can be efficiently used regardless of which valve from among an ON/OFF valve and a linear valve is used as the hydrogen discharge valve A3. However, when the hydrogen discharge valve A3 is a linear valve, as shown in FIG. 2(*a*), an opening/closing control signal C3 for setting an intermediate valve opening, an opening/closing control signal C4 whose rising/ falling edge moderately declines at a constant inclination, or the like may be used. With regard to the opening/closing control signal input in the hydrogen discharge valve A3 when it is determined whether a failure has occurred in the valve, it is preferable to provide variation in the input signal by inputting the opening/closing control signals having different waveform patterns (for example, the opening/closing control signals C1, C3 and C4) by turns or randomly at predetermined intervals rather than continuously inputting the signals having a constant waveform pattern (for example, only the opening/closing control signals C1 and C2). Thus, the determination as to whether a failure has occurred can be made further accurately. For example, when a linear valve is employed as the hydrogen discharge valve A3, it is also possible to determine whether an abnormality has occurred in opening/closing of the hydrogen discharge valve A3 based on the gas state quantity (a concentration, a flow speed, a pressure, a proportion of each ingredient, a temperature, a dielectric constant or the like) at a position downstream from the hydrogen discharge valve A3 when the opening/closing control signal input in the hydrogen discharge valve A3 is switched from the opening/closing control signal for achieving an opening of 30% to the opening/closing control signal for achieving an opening of 80%, and a change with time in the gas state quantity. In this case, it is possible to detect a degree of opening of the hydrogen discharge valve A3 at which an abnormality occurs. It is therefore possible to enhance accuracy of the determination as to whether an abnormality has occurred.

When an abnormality is detected in opening/closing of the hydrogen discharge valve A3, the control portion 90 performs the following various operations in order to deal with the failure; the control portion 90 (1) prevents hydrogen from leaking to the outside of the system by closing the shutoff valve A1, which is a fuel gas supply source, so as to suppress deterioration of the fuel efficiency, (2) suppresses electric power generation by the fuel cell 20, (3) controls the PCU 80 so as to drive the motor 82 using electric power stored in the secondary battery 81, and (4) notifies the driver that a failure has occurred in the hydrogen discharge valve A3 using a display or an alarm sound. As described above, the control portion 90 also serves as means for dealing with a failure.

According to the embodiment, whether an abnormality, has occurred in opening/closing of the hydrogen discharge valve A3 is determined based on a signal output from the hydrogen sensor S1 provided downstream from the hydrogen discharge valve A3. It is therefore possible to determine whether an abnormality has occurred in opening/closing of the hydrogen discharge valve A3 not only when the operation of the fuel cell 20 is stopped but also when the fuel cell 20 is being operated in the transition state. Also, the hydrogen off-gas and the external gas are introduced to the mixing chamber 50. It is therefore possible to accurately detect a change in the hydrogen concentration based on the difference in the hydrogen concentration between when the hydrogen off-gas is mixed with the external gas and when the hydrogen off-gas is not mixed with the external gas. Also, by using the hydrogen sensor S1, it is possible to detect a minute leakage due to intrusion of a foreign substance, which is difficult for the pressure sensor to detect.

Note that, in the embodiment, the hydrogen concentration is detected as the gas state quantity of the hydrogen gas. However, the invention is not limited to this. As the gas state quantity of the hydrogen off-gas, a physical quantity such as a flow speed, a pressure, a proportion of each ingredient, a temperature, a dielectric constant or the like of the hydrogen off-gas may be used.

Figure 3:
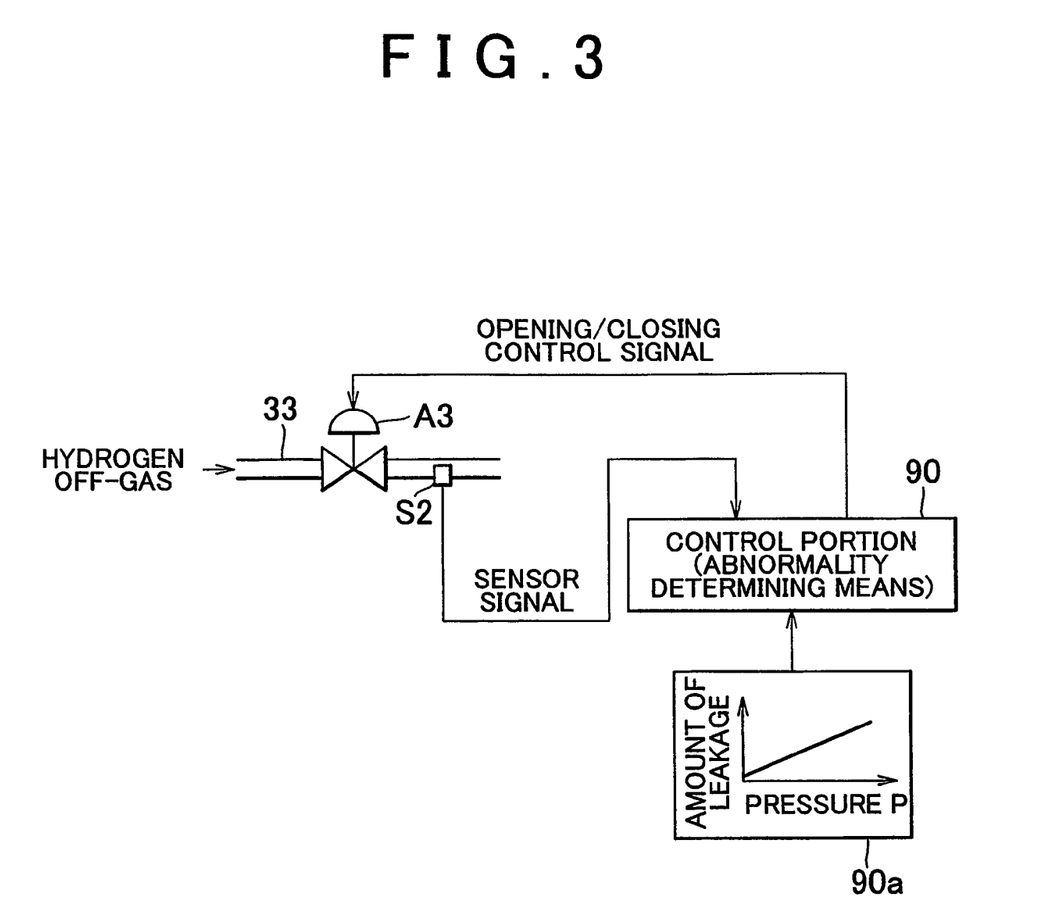
FIG. 3 is a diagram mainly showing gas state quantity detecting means in a second embodiment.

Hereafter, a second embodiment of the invention will be described. FIG. 3 is a diagram showing a structure of gas state quantity detecting means according to the second embodiment. In the embodiment, a pressure sensor S2 which detects a pressure of the hydrogen off-gas is provided in the discharge passage 33 at a position downstream from the hydrogen discharge valve A3. In map data 90a, a pressure P, which is detected when a gas leakage has not occurred in the hydrogen discharge valve A3, is used as a reference pressure, and the amount of gas leakage corresponding to the pressure increase with respect to the reference pressure is recorded. The control portion (abnormality determining means) 90 provides an opening/closing control signal to the hydrogen discharge valve A3, detects a change in the pressure between before and after the opening/closing control signal is provided, and determines whether an abnormality has occurred in opening/closing of the hydrogen discharge valve A3 in reference to the map data 90a.

Figure 4:
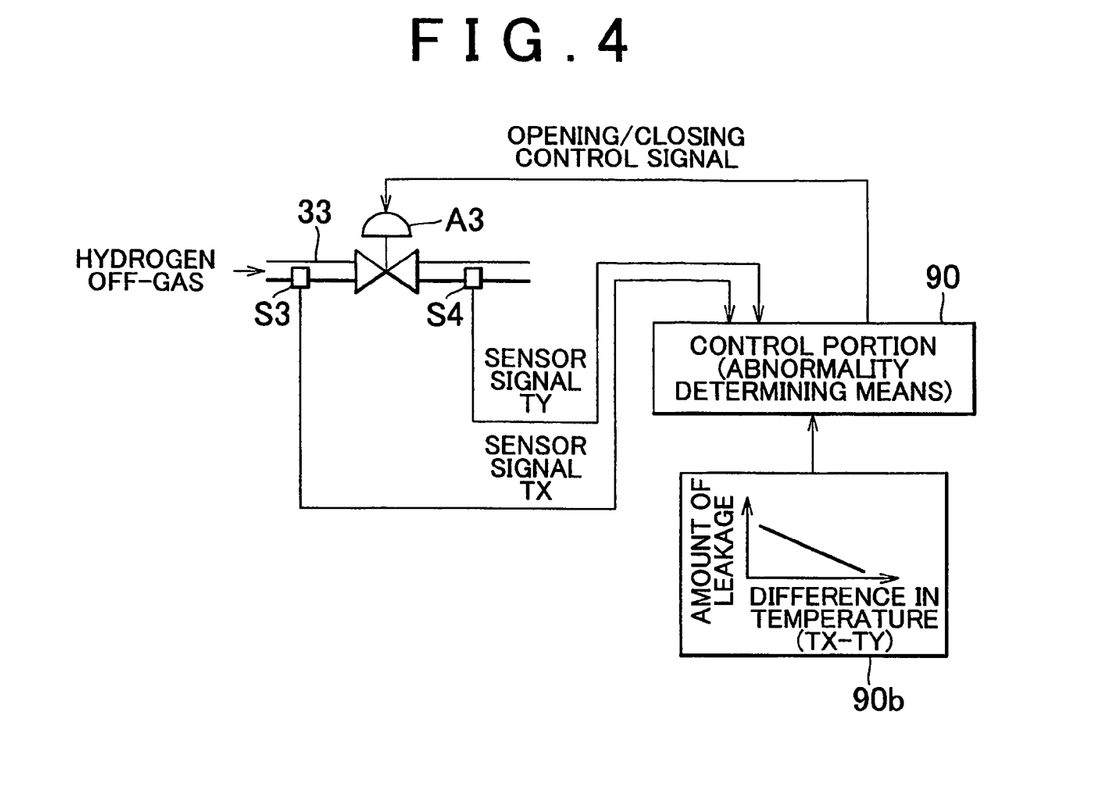
FIG. 4 is a diagram mainly showing gas state quantity detecting means in a third embodiment.

Hereafter, a third embodiment of the invention will be described. FIG. 3 is a diagram showing a structure of gas state quantity detecting means according to the third embodiment. In the embodiment, a temperature sensor S3 which detects a temperature of the hydrogen off-gas is provided in the discharge passage 33 at a position upstream from the hydrogen discharge valve A3, and a temperature sensor S4 is provided in the discharge passage 33 at a position downstream from the hydrogen discharge valve A3. When the temperature detected by the temperature sensor S3 is shown by TX, and the temperature detected by the temperature sensor S4 is shown by TY, TX is equal to TY (TX=TY) in the state where the hydrogen discharge valve A3 is open. On the other hand, in the state where the hydrogen discharge valve S3 is closed, TX is higher than TY (TX>TY), since the temperature of the hydrogen off has been increased due to heat generated by the cell reaction. By detecting a difference between the temperature TX and the temperature TY, gas leakage from the hydrogen discharge valve A3 can be detected. The amount of gas leakage corresponding to the difference in temperature (TX−TY) is recorded in map data 90b. As the difference in temperature (TX−TY) becomes smaller, the amount of gas leakage becomes larger. On the other hand, as the difference in temperature (TX−TY) becomes larger, the amount of gas leakage becomes smaller.

The control portion (abnormality determining means) 90 provides an opening/closing control signal to the hydrogen discharge valve A3, obtains the difference in temperature (TX−TY) according to the signals output from the temperature sensors S3 and S4, and determines whether an abnormality has occurred in opening/closing of the hydrogen discharge valve A3 in reference to the map data 90b. When a predetermined threshold value is set for the difference in temperature (TX−TY), it can be determined which state from among the "fully open state", "half open state" and "fully closed state" the hydrogen discharge valve A3 is in, based on the difference in temperature (TX−TY). By providing the gas state quantity detecting means not only on the downstream side but also on the upstream side of the hydrogen discharge valve A3, it is possible to accurately determine which state from among the "fully open state", "half open state" and "fully closed state" the hydrogen discharge valve A3 is in. Note that, the temperature sensor S3 is not necessarily provided, and the temperature sensor S3 may be omitted and the determination as to whether an abnormality has occurred in the hydrogen discharge valve A3 may be made using only the temperature sensor S4.

Figure 5:
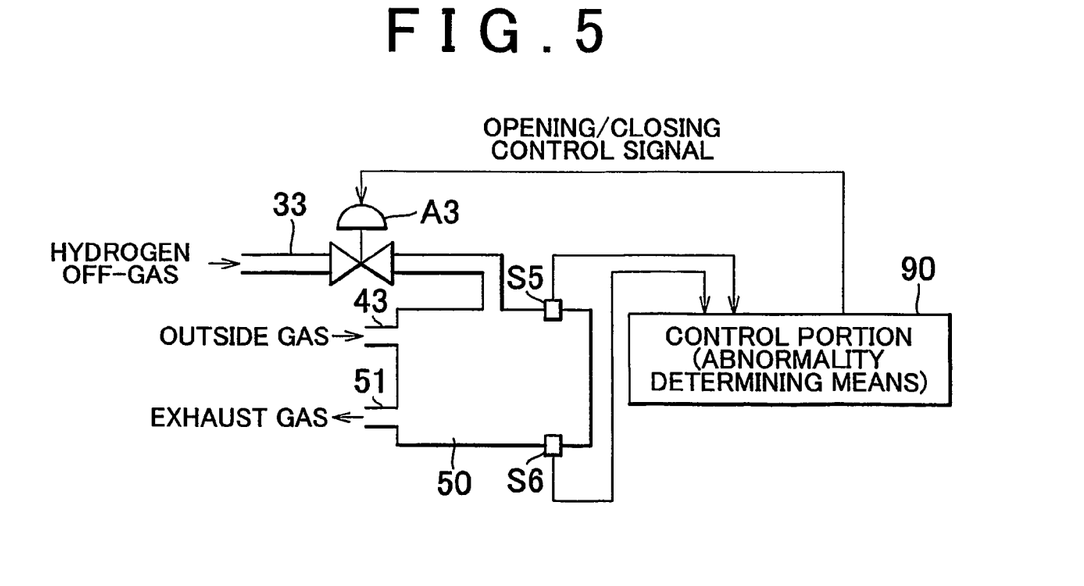
FIG. 5 is a diagram mainly showing gas state quantity detecting means in a fourth embodiment.

Hereafter, a fourth embodiment of the invention will be described. FIG. 5 is a diagram showing a structure of gas state quantity detecting means according to the fourth embodiment. In the embodiment, paired electrodes S5 and S6, which are opposed to each other, are provided in the mixing chamber 50. The dielectric constant of the gas varies between the state where only the external gas is introduced to the mixing chamber 50 and the state where the hydrogen off-gas is mixed with the external gas. Therefore, by reading a change in the capacity of a capacitor provided between the electrodes S5 and S6, whether an abnormality has occurred in the hydrogen discharge valve A3 can be determined. The control portion (abnormality determining means) 90 provides an opening/closing control signal to the hydrogen discharge valve A3, detects a change in the capacity of the capacitor between before and after the opening/closing control signal is provided, and determines whether an abnormality has occurred in opening/closing of the hydrogen discharge valve A3.

Figure 6:
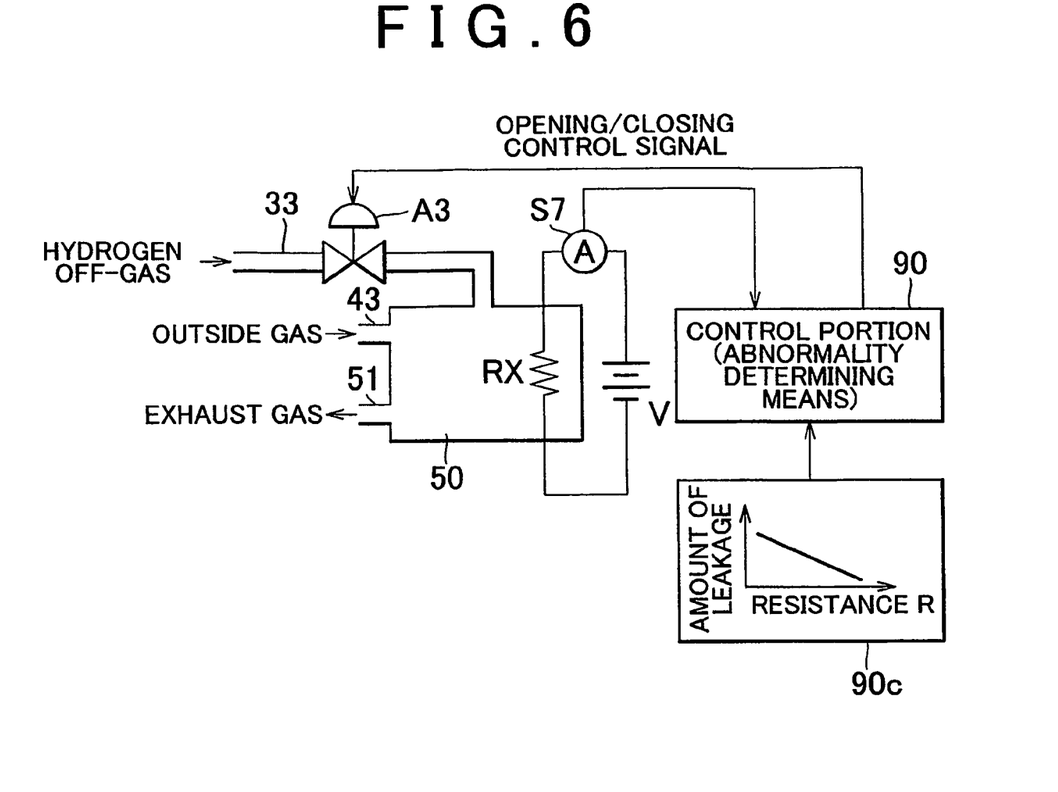
FIG. 6 is a diagram mainly showing gas state quantity detecting means in a fifth embodiment.

Hereafter, a fifth embodiment of the invention will be described. FIG. 6 is a diagram showing a structure of gas state quantity detecting means according to the fifth embodiment. In the embodiment, a heat wire resistance RX connected to a voltage source V is provided in the mixing chamber 50, and the heat wire resistance RX is made to generate heat using Joule heat. In the state where the hydrogen off-gas is mixed with the external gas, the heat conductivity of the heat wire resistance RX is high compared with the case where only the external gas is introduced to the mixing chamber 50. Accordingly, a resistance value R of the heat wire resistance RX decreases. When a failure occurs in opening/closing of the hydrogen discharge valve A3 and the hydrogen off-gas leaks, the resistance value R of the heat wire resistance RX decreases. Therefore, by detecting the resistance value R, whether a failure has occurred in opening/closing of the hydrogen discharge valve A3 can be determined. The resistance value R can be obtained by dividing a voltage output from the voltage source V by a current value read by an electric current sensor S7. The amount of gas leakage corresponding to the resistance value R of the heat resistance RX is recorded in map data 90c. The control portion (abnormality determining means) 90 provides an opening/closing control signal to the hydrogen discharge valve A3, obtains an amount of the change in the resistance value R between before and after the opening/closing control is provided, and determines whether an abnormality has occurred in opening/closing of the hydrogen discharge valve A3 in reference to the map data 90c.

Figure 7:
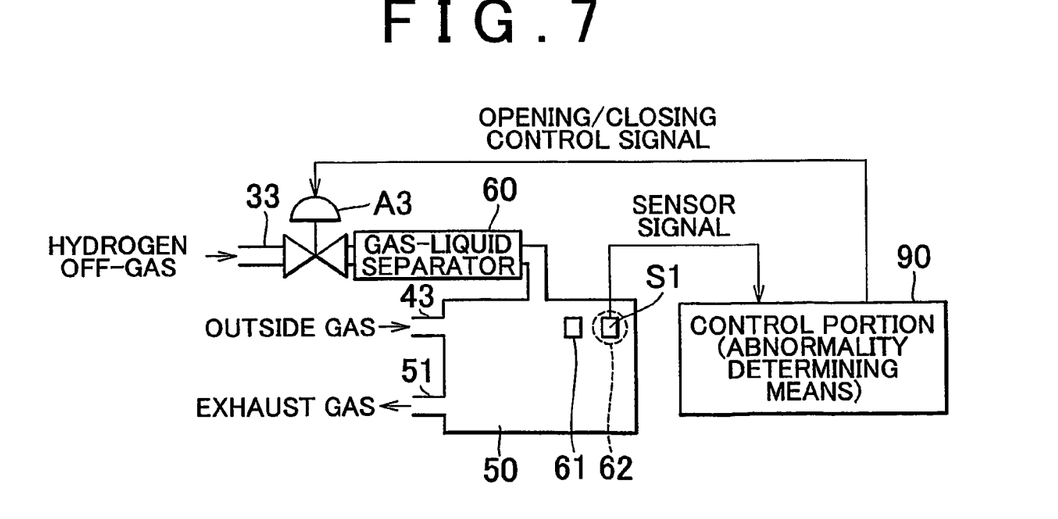
FIG. 7 is a diagram mainly showing gas state quantity detecting means in a sixth embodiment.

Hereafter, a sixth embodiment of the invention will be described. FIG. 7 is a diagram showing a structure of gas state quantity detecting means according to the sixth embodiment. In the embodiment, a gas-liquid separator 60 is provided in the discharge passage 33 at a position downstream from the hydrogen discharge valve A3 and upstream from the hydrogen sensor S1, and water contained in the hydrogen off-gas is separated into gas and liquid. If a water droplet and the like adhere to the hydrogen sensor S1, a problem is caused in the detection of hydrogen concentration. However, by separating the hydrogen off-gas into gas and liquid in advance, it is possible to measure the hydrogen concentration accurately. As the gas-liquid separator 60, a cyclone separator which separates water into gas and liquid by swirling the hydrogen off-gas at a high speed and draining water in a centrifugal direction, a heat exchange gas-liquid separator by air cooling or water cooling, or the like may be used.

As gas-liquid separating means, in addition to the gas-liquid separator 60, for example, a gas-permeable cover 61 may be provided at a position upstream from the hydrogen sensor S1. Further, the hydrogen sensor S1 may be covered with a bag-shaped gas-permeable cover 62. It is preferable that the gas-permeable covers 61 and 62 be made of hydrogen-permeable material. However, the gas-permeable covers 61 and 62 may be made of gas-permeable material which can remove only water. As such material, for example, Gore-Tex™ is suitably used.

The invention claimed is:

1. An abnormality detecting device of a fuel cell system, comprising:
   a hydrogen off-gas circulation passage for making hydrogen off-gas discharged from a fuel cell flow back to an anode of the fuel cell;
   a discharge passage for discharging part of the hydrogen off-gas, which is circulated through the hydrogen off-gas circulation passage, from the hydrogen off-gas circulation passage;
   a hydrogen discharge valve provided in the discharge passage; and
   an abnormality determining portion for determining whether an abnormality has occurred in opening/closing of the hydrogen discharge valve, further comprising:
   a gas state quantity detecting portion for detecting a gas state quantity of the hydrogen off-gas, the gas state quantity detecting portion being provided in the discharge passage at a position downstream from the hydrogen discharge valve, wherein the abnormality determining portion determines whether an abnormality has occurred in opening/closing of the hydrogen discharge valve based on the gas state quantity of the hydrogen off-gas.

2. The abnormality detecting device of a fuel cell system according to claim 1, further comprising:
   a mixing chamber for mixing the hydrogen off-gas discharged from the discharge passage with external gas, wherein the gas state quantity detecting portion detects the gas state quantity of the hydrogen off-gas which is mixed with the external gas in the mixing chamber.

3. The abnormality detecting device of a fuel cell system according to claim 2, wherein the external gas is part of oxidizing gas to be supplied to a cathode of the fuel cell.

4. The abnormality detecting device of a fuel cell system according to claim 1, wherein the hydrogen discharge valve is an electromagnetic valve, and the abnormality determining portion determines whether an abnormality has occurred in opening/closing of the hydrogen discharge valve based on the gas state quantity detected by the gas state quantity detecting portion so as to deal with a change in an input of an opening/closing control signal to the electromagnetic valve.

5. The abnormality detecting device of a fuel cell system according to claim 4, wherein the abnormality determining portion determines whether an abnormality has occurred in opening/closing of the electromagnetic valve based on a change with time in the gas state quantity detected by the gas state quantity detecting portion so as to deal with the change in the input of the opening/closing control signal to the electromagnetic valve.

6. The abnormality detecting device of a fuel cell system according to claim 1, wherein the gas state quantity is a physical quantity related to one of a hydrogen concentration, a flow speed, a pressure, a proportion of each ingredient, a temperature and a dielectric constant of the hydrogen off-gas.

7. The abnormality detecting device of a fuel cell system according to claim 6, further comprising:
   a pressure sensor which is provided in the discharge passage at a position downstream from the hydrogen discharge valve, and which detects a pressure of the hydrogen off-gas.

8. The abnormality detecting device of a fuel cell system according to claim 6, further comprising:

a temperature sensor which is provided in the discharge passage at a position downstream from the hydrogen discharge valve, and which detects a temperature of the hydrogen off-gas.

9. The abnormality detecting device of a fuel cell system according to claim 6, further comprising:

paired electrodes which are provided in the mixing chamber and which are opposed to each other in order to detect a dielectric constant of the hydrogen off-gas.

10. The abnormality detecting device of a fuel cell system according to claim 6, further comprising:

a heat wire resistance which is provided in the mixing chamber and which detects a heat conductivity of the hydrogen off-gas.

11. The abnormality detecting device of a fuel cell system according to claim 1, further comprising:

a gas state quantity detecting portion for detecting the gas state quantity of the hydrogen off-gas, the gas state quantity detecting portion being provided in the discharge passage at a position upstream from the hydrogen discharge valve, wherein the abnormality determining portion detects an abnormality in opening/closing of the hydrogen discharge valve based on the gas state quantity detected by the gas state quantity detecting portion provided on each of an upstream side and a downstream side of the hydrogen discharge valve.

12. The abnormality detecting device of a fuel cell system according to claim 1, further comprising:

a gas-liquid separating portion for separating the hydrogen off-gas into gas and liquid, wherein the gas state quantity detecting portion detects the gas state quantity of the hydrogen off-gas which has been separated into gas and liquid by the gas-liquid separator.

13. The abnormality detecting device of a fuel cell system according to claim 1, further comprising:

a portion for dealing with a failure when the abnormality determining portion detects an abnormality in opening/closing of the hydrogen discharge valve.

14. The abnormality detecting device of a fuel cell system according to claim 1, wherein the gas state quantity detecting portion being provided in the discharge passage at a position outside the hydrogen off-gas circulation passage.

* * * * *

UNITED STATES PATENT AND TRADEMARK OFFICE
CERTIFICATE OF CORRECTION

PATENT NO. : 7,718,286 B2 Page 1 of 1
APPLICATION NO. : 10/576788
DATED : May 18, 2010
INVENTOR(S) : Nobuo Fujita It is certified that error appears in the above-identified patent and that said Letters Patent is hereby corrected as shown below:

IN THE SPECIFICATION:

| <u>Column</u> | <u>Line</u> | |
|---|---|---|
| 10 | 20 | Change "FIG. 3" to --FIG. 4--. |

Signed and Sealed this

Seventh Day of September, 2010

David J. Kappos
*Director of the United States Patent and Trademark Office*